Jan. 13, 1942.　　D. MARINSKY ET AL　　2,270,068
SAFETY PIN LOCK SLIDER
Filed Sept. 7, 1939
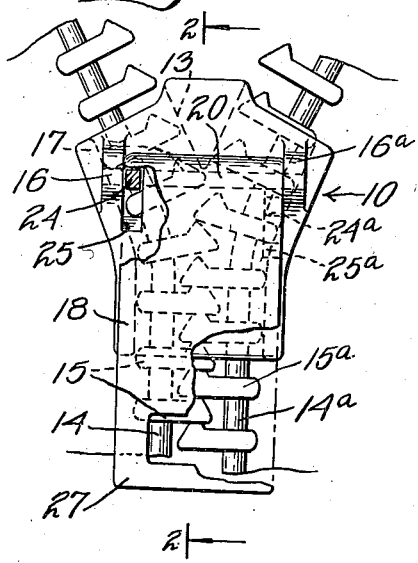
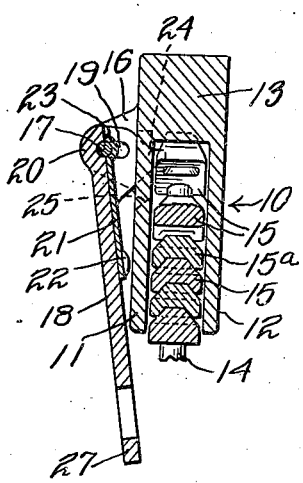
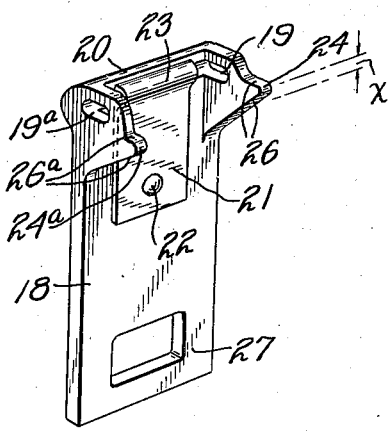
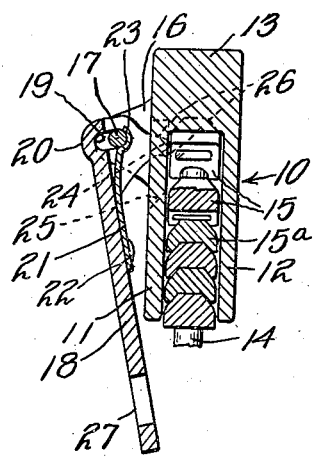
INVENTORS
DAVIS MARINSKY
BY LOUIS H. MORIN
ATTORNEY Patented Jan. 13, 1942

2,270,068

UNITED STATES PATENT OFFICE 2,270,068

SAFETY PIN LOCK SLIDER

Davis Marinsky and Louis H. Morin, Bronx, N. Y.

Application September 7, 1939, Serial No. 293,702

7 Claims. (Cl. 24—205.5)

This invention relates to lock sliders for separable fasteners employing stringers wherein the slider may be maintained against movement longitudinally of the stringers under normal tensions tending to separate the stringers, and at the same time may be permitted to move along the stringers when the stress tending to separate the same is excessive. More particularly the invention relates to a slider of the character described wherein the pivot end of the lock pull is provided with a resilient mounting in connection with the slider to permit outward movement of the pull by the links when the slider is subjected to excessive strain. The novel features of the invention will be best understood from the following description and annexed drawing in which certain embodiments of the invention are disclosed, and in which the separate parts are designated by suitable reference characters in each of the views, and in which:

Fig. 1 is a plan view of part of a stringer showing one of our improved sliders thereon with part of the construction broken away and in section.

Fig. 2 is a view substantially on the line 2—2 of Fig. 1.

Fig. 3 is a view similar to Fig. 2 indicating the position assumed by the pull when yielding to excessive stresses tending to separate the stringers, and Fig. 4 is a perspective view of one form of pull made according to our invention.

In the separable fastener art, considerable difficulty has been experienced from time to time in the use of sliders of the pin lock type, due to the fact that the positive engagement provided by this type of lock between the slider and the links of the fastener will not yield to abnormal stresses placed upon the fastener stringers. In other words, when a fastener having a normal pin lock slider is subjected to unusual transverse stress tending to separate the fasteners, either the pin element of the lock or the fastener links or both, may be damaged, thereby making the fastener inoperative or at least destroying the proper functioning of the slider and fastener. It is the purpose of the present invention to provide means for relieving the positive lock when the fastener is subjected to abnormal stresses without in any way interfering with the neatness, simplicity and efficiency of the pin locking slider.

For purposes of indicating one adaptation of our invention, there is shown in the drawing a slider 10 having top and bottom walls 11 and 12 respectively joined at one end thereof by a connecting web 13 forming diverging channels at said end of the slider. The slider has been shown as arranged upon interengaging fastener stringers 14, 14a having links 15, 15a arranged and spaced longitudinally thereof.

The top wall 11 of the slider is provided adjacent the wide end thereof with bearing forming projections 16, 16a adapted to receive the end portions of a transverse pintle pin 17. The pin 17 in turn pivotally supports a finger piece or pull 18 in connection with the slider 10, the finger piece engaging said pin by means of elongated bearing apertures 19, 19a (see Fig. 4) formed in the enlarged mounting end 20 of the pull. The pull 18 is further provided with a spring member 21 secured thereto by suitable means as indicated by the riveted lug 22 on the lower side surface of the pull. Any other suitable mounting may be provided however for the spring 21. The spring has at the free end thereof a wide bearing portion 23 of semi-cylindrical cross sectional form adapted to resiliently engage the pin 17 intermediate the elongated bearing apertures 19, 19a.

A pull is also provided, preferably adjacent the apertures 19, 19a with one or more protruding lock elements 24, 24a adapted to pass through apertures 25, 25a formed in the top wall 11 of the slider and to engage the fastener stringers intermediate the links 15, 15a thereon. It will of course be apparent that in most instances, only one lock element 24 will be employed. When two elements 24, 24a are employed, however, it will be apparent that the two must be spaced longitudinally of the pull as indicated at X in Fig. 4 a distance equal to half the distance between corresponding points on successive links of one stringer in order to provide the proper offset to engage between pairs of links on each stringer when the stringers are in meshed or interlocking relationship. The locking projections 24, 24a may of course be arranged at any desired position along the pull 18, but they have been indicated as preferably arranged closely adjacent the bearing portion of the pull and in substantial alinement with the bearing apertures 19, 19a therein.

The spring 21 normally supports the pin in firm engagement with the upper ends of the apertures 19, 19a or in other words, in the position shown in Fig. 2 of the drawing, so as to project the lock members 24, 24a into the spaces between the links 15, 15a. It will be noted, however, that the projections 24, 24a have at the extremity thereof and arranged transversely with respect to the pull, a substantially wedge-shaped contour as seen at 26, 26a. The wedge-like contour of the projecting members 24, 24a provides a cam-like engagement between these projections and the fastener links, and it will be apparent that when excessive stress is placed upon the stringers or slider tending to move one with respect to the other while the pull is in the locked position, the projections 24 may ride up and over the links 15 due to the yieldable engagement between the spring 21 and the pin 17.

The spring will permit outward movement of the projections 24 to the extent of the length of the bearing apertures 19, 19a in the pull, and it will be apparent that these apertures are sufficiently long to insure clearance between the projections 24, 24a and the links 15, 15a when the pull is in the position shown in Fig. 3 of the drawing. It should also be noted that the spring 21 may come into play when in the pivotal movement of the pull into the locked position, the projections 24, 24a do not immediately aline themselves with the spaces between the fastener links. In this case, the pull will be permitted to drop from the position shown in Fig. 3 to the position shown in Fig. 2 by slightly moving the slider in either direction along the stringers after the pull has been pivotally moved into the terminal position shown in these figures. It is important of course that the spring 21 be of proper resilience to support the pull in the manner shown in Fig. 2 under the stresses normally experienced in using a fastener while at the same time permitting flexure into the position shown in Fig. 3 when an abnormal stress is applied, which might otherwise damage the fastener.

It will of course be apparent that the particular shape and contour of the various parts of the device and particularly of the finger engaging portion 27 of the pull may be altered in any way desired by the manufacturer without departing from the scope of the invention. Likewise, the particular mode of attaching the spring 21 to the pull may be modified. The structure herein disclosed is of course equally applicable to use in connection with both metallic and plastic sliders and the parts may be fashioned by any of the conventional casting or stamping operations. It will be noted in this connection that the structure as shown in the drawing is particularly adapted to be formed by die casting. It should also be noted that it is within the scope of the invention, especially when plastic material is employed to form the locking projections 24, 24a from independent members suitably secured to the remainder of the pull, and for that matter in plastic devices of the class described the mounting end or even the entire body of the pull may be suitably reinforced to provide the necessary strength and rigidity to the part.

Having fully described our invention, what we claim as new and desire to secure by Letters Patent, is:

1. A lock slider for separable fasteners of the class described comprising in combination a channeled body having spaced top and bottom walls joined by a connecting web forming diverging channels therebetween, projections on one wall of said slider body, a pull pivotally secured to said projections, said pull having at least one lock element adapted to pass through an aperture formed in said wall of the slider body, means at the pivot portion of said pull providing for additional movement of the pivot end of said pull with respect to said slider in a plane substantially perpendicularly arranged with respect to the plane of said pull, said last named means including a pivot pin secured to said slider and mounted in apertures in the pivot portion of said pull said apertures being elongated in a direction substantially perpendicular to the plane of said pull and registering with said pivot pin, and resilient means secured to said pull for normally supporting said pull in a manner to bear against the pivot pin at the ends of said apertures adjacent the upper surface of said pull.

2. A lock slider for separable fasteners of the class described comprising in combination a channeled body having spaced top and bottom walls joined by a connecting web forming diverging channels therebetween, projections on one wall of said slider body, a pivot pin carried by said projections, said pull being pivotally secured to said projections and having at least one lock element adapted to pass through an aperture formed in said wall of the slider body, means at the pivot portion of said pull providing for additional movement of the pivot end of said pull with respect to said slider in a plane substantially perpendicularly arranged with respect to the plane of said pull, said last named means including apertures in the pivot portion of said pull elongated in a direction substantially perpendicular to the plane of said pull and registering with a pivot pin secured to said slider, resilient means secured to said pull for normally supporting said pull in a manner to bear against the pivot pin at the ends of said apertures adjacent the upper surface of said pull, the locking projection on said pull in the last named position thereof operatively extending into the channel of said slider, and the length of the bearing apertures in said pull being sufficient to permit resilient withdrawal of the lock element from said channel.

3. A pull having a locking projection thereon, said pull being adapted for use in connection with channeled sliders of the class described, said sliders having a transverse pivot forming pin secured thereto and further having an elongated aperture registering with the channel thereof adapted to receive the locking projection on said pull, said pull comprising an elongated body having pivot forming means at one end thereof, said pivot forming means including enlarged side members at said end of the pull having apertures therein elongated in a direction substantially perpendicular to the surfaces of said pull, means resiliently supporting said pull to engage the pivot pin on said slider at the ends of said apertures adjacent the upper surface thereof, said last named means comprising a flat spring member secured to said pull in spaced relation to the pivot portion thereof.

4. A pull having a locking projection thereon, said pull being adapted for use in connection with channeled sliders of the class described, said sliders having a transverse pivot forming pin secured thereto and further having an elongated aperture registering with the channel thereof adapted to receive the locking projection on said pull, said pull comprising an elongated body having pivot forming means at one end thereof, said pivot forming means including enlarged side members at said end of the pull having apertures therein elongated in a direction substantially perpendicular to the surfaces of said pull, means resiliently supporting said pull to engage the pivot pin on said slider at the ends of said apertures adjacent the upper surface thereof, said last named means comprising a flat spring member secured to said pull in spaced relation to the pivot portion thereof, and the pivot forming end of said spring being semi-cylindrical in contour and contacting said pivot pin throughout the greater portion of the length of said pin disposed between the enlarged side members of said pull.

5. A lock slider for separable fasteners of the class described comprising a slide member having top and bottom walls, an upstanding bearing portion carried by one of said walls and a pintle on said bearing portion, a pull comprising a substantially planar body portion and a portion substantially perpendicular to said body portion and forming a lock element adapted to pass through an aperture in a wall of said slide portion and provided with a slot at one end of said pull engaging said pintle which is slidably and rotatably mounted in said slot, said slot being elongated in a direction substantially perpendicular to the plane of the pull, and resilient means carried by said pull and yieldingly engaging said pintle in the slot and between the resilient means and the pull, whereby said locking element is normally held in locking engagement with the fastener and is permitted translatory movement out of said engagement in a direction substantially perpendicular to the walls of the slide portion against the yielding force of said resilient means and within the confines of said slot.

6. In sliders for separable fasteners, a pull, said pull comprising an elongated body, means projecting from one side surface of one end portion of said body forming pivot pin engaging means for pivotally supporting the pull, said means being elongated in a direction substantially perpendicular to said surface of the pull, a spring on said surface of the pull, the free end portion of the spring being arranged in alignment with said pivot engaging means, and said end portion of the spring being shaped to engage the pin forming the pivot of said pull.

7. In sliders for separable fasteners of the character described having pivot pin means to pivot the pull on the slider, a pull, said pull comprising an elongated body, a flange projecting laterally from one side surface of one end portion of said body, said flange being provided with a slot elongated in a direction substantially perpendicular to said surface of the pull and forming means to pivotally and slidably mount the pull on said pivot pin, a leaf spring on said surface of the pull, one end of said spring being secured to said surface, the free yieldable end portion of the spring being aligned with said slot and being shaped to provide a bearing to engage said pivot pin.

DAVIS MARINSKY.
LOUIS H. MORIN.